A. T. SAUNDERS.
METHOD OF PRODUCING COLORED MOTION PICTURE FILMS.
APPLICATION FILED JULY 2, 1917.
1,317,825. Patented Oct. 7, 1919.
2 SHEETS—SHEET 2.
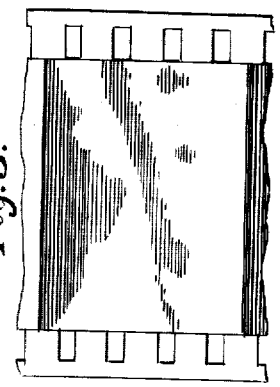
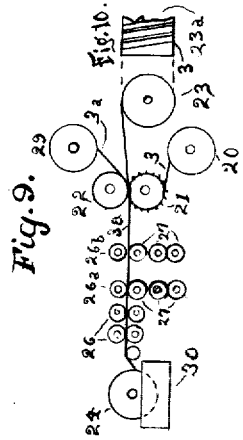
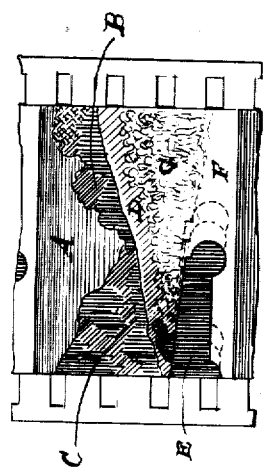
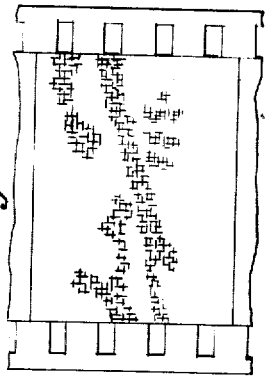
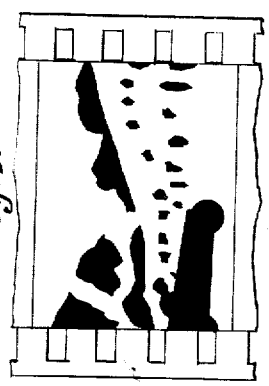
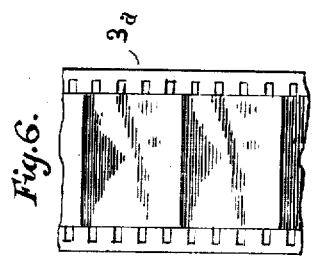
INVENTOR.
Addison T. Saunders

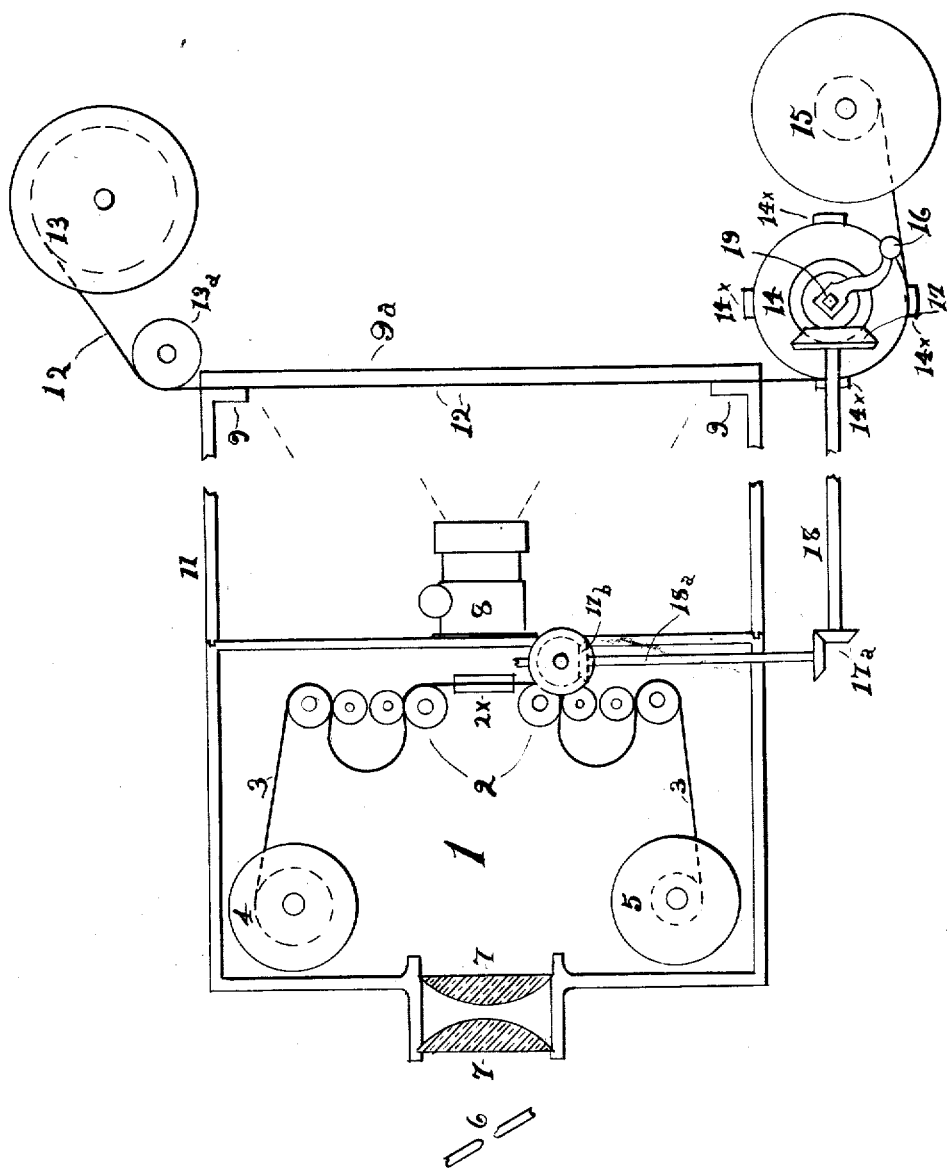

UNITED STATES PATENT OFFICE.

ADDISON T. SAUNDERS, OF CHICOPEE, MASSACHUSETTS.

METHOD OF PRODUCING COLORED MOTION-PICTURE FILMS.

1,317,825. Specification of Letters Patent. Patented Oct. 7, 1919.

Application filed July 2, 1917. Serial No. 178,301.

*To all whom it may concern:*

Be it known that I, ADDISON T. SAUNDERS, a citizen of the United States, and resident of Chicopee, in the county of Hampden and State of Massachusetts, have invented certain new and useful Improvements in Methods of Producing Colored Motion-Picture Films, of which the following is a specification.

My invention relates to the art of producing motion pictures in colors. More particularly, it provides a new method of coloring motion picture films, or producing colored film.

It is well known that, owing to the low actinic values of the warmer colors, the usual processes of making photographs in natural colors, or of making sets of color-selective negatives to be employed in making component printing plates—such, for instance as the process of making a component negative through a complementary color-filter for each of the colors to be used—are too slow to be practicable for photographing moving objects such as form the chief subjects of motion pictures.

My method differs radically from all those which depend upon the making of photographs in natural colors direct from nature, or upon color-selective negatives so made.

Color effects have been produced in motion pictures by tinting the film, by the employment of color-shutters blending the colors upon the screen by the persistency of vision, by stenciling or blocking out in combination with color media, etc., but prior to my invention no means have been provided which made it possible to produce colored films in miltiple and at a cost which rendered their general use practicable; nor has there been disclosed any method which would enable the exact placing by hand of colors relatively to the forms to which they are applied.

These desiderata are objects of, and are supplied by, my invention.

The minuteness of the image on the motion picture film makes it impossible to correctly place color by hand and to limit its area to the almost microscopic points which most subjects present, or to block out the smaller objects of the usual scenes. If a colorist of exceptional touch and skill could place the color there is no brush or other known carrier of pigment minute enough to be employed without hopelessly overlapping the desired bounds in many passages. Therefore the present hand-colored films are either featured with this fault or with broad masses of color, only, the more difficult color detail being omitted.

My invention enables not only the rendering upon the screen of the primary or fundamental colors, but the combining of them in any desired proportions, producing every shade or degree desired, from the faintest tint to full color, with the effect of elaborate and accurate hand painting.

The method consists, broadly, in making enlarged projections of the individual views or picture units of a motion picture film or negative upon a suitable surface, executing by the guidance of such projections, upon this enlarged scale, manually with pigments or other suitable media, capable of rendering the necessary gradations, photographable representations of the desired disposition of colors for the film and by known photo-color processes preparing a colored film upon the original scale by the use of these color representations and certain original devices described below. By this procedure and because of the large scale upon which it enables the hand work to be done, accurate and detailed execution is made practicable. The reduction of this hand work to the scale of the original film in the form of color printing strips analogous to the usual photo-color printing blocks, enables printing therefrom upon the film in transparent colors—the printing strip and the film being, of course, run in register,—and this results in effects identical with those which would be produced were it possible to color freely the minute film.

The manner in which I prefer to carry my invention into effect will be better understood by reference to the accompanying drawings, which are partly diagrammatic, and in which—

Figure 1 shows in broken view a combined projector and enlarging and copying camera with a motion picture film and a roll of paper for a series of enlarged color representations in position for use.

Fig. 2 represents a picture unit or individual view from a continuous series of enlarged color representations from a motion picture film, with certain dotted lines added which will be explained below.

Figs. 3, 4 and 5 illustrate various component-color representations for the same view in a motion picture film as that shown in Fig. 2.

Fig. 6 shows a portion of a continuous color-printing strip for one of the component colors for the same film.

Fig. 7 illustrates the treatment in an enlarged color representation for reduction to produce a stencil-like color effect.

Fig. 8, section of a film negative as made by employment of an enlarged color representation such as shown in Fig. 7.

Fig. 9 shows the arrangement of parts in a device for printing the component colors upon a motion picture film from continuous color-printing strips such as that illustrated in Fig. 6.

The preferred manner of carrying out my invention is as follows:—

The film 3, of a subject to be produced in color, carried upon the reel 4, (Fig. 1) is threaded into the motion head 2, and onto the reel 5, by the usual blank lead, and the first view is framed in the aperture 2ˣ. A continuous roll of art paper 12, carried upon the reel 13, is roved between the frame 9, and the backing board 9ᵃ, over the sprocket roll 14, and onto the reel 15.

The roll 12 has marginal slots, as shown in Figs. 2, 3, etc., corresponding with the slots in a motion picture film and these are engaged by the sprockets 14ˣ 14ˣ, etc., of the roller 14. By these, the roller being rotated as desired, by the crank 16, I advance the roll 12 sufficiently to permit of a turn around 15. By means of a clutch mounted in the line of shafting 18, not shown, I may then connect the beveled gears 17, through said shafting with the gears 17ᵃ driving the shaft 18ᵃ which in turn operates the motion head 2 through the gears 17ᵇ, and a like pair (not shown).

Light from the source 6 is now permitted to pass through the condensers 7 7, the first view of the film 3 and the objective 8, and the enlarged image of the view is focused upon the section of the paper 12, within the frame 9.

Each of the component colors desired for a film is represented upon a different roll. Assuming that the film to be colored has the scene shown in Fig. 2 as its first view and that the desired color scheme is as follows: The sky A, blue; the foliage B, as an autumn wood, yellow, red and green; the hill C, to have patches of green and red of somewhat less strength than the full colors in order to give, in combination with the darks of the monochromatic film, shades of greenish and reddish brown; the upland D, green; the motor car E, together with the driver, red; all as indicated by symbolic shading in Fig. 2; the roadway F, to be left in color of the monochromatic photo film; and a variety of colors and tints, not indicated in the figure, for the crowd of people G. Assuming also that the color representation for the red is to be the first made, I may employ a pigment of the actual color, but I prefer to use, as for the other component color representations, a monochromatic medium of photographable qualities, such, for instance, as carbon black, which used either as washes of various densities or as body-color in conjunction with a white, is capable of rendering all gradations from light to deep shades. With this material and guided by the projected image I proceed to lay in upon the portions of the paper covered by the projection of the objects designated for red, and keeping to the forms and limits of these projected objects, patches and masses and lines of pigment in different depths of tint, as roughly indicated in Fig. 3. The motor car and driver being in the foreground and principal objects I want in full red. I therefore lay these in in solid black. The sky is of course left blank. For the hill C, I apply patches, light to deep shades, and in like manner treat the autumn woods. Certain predetermined parts of the costumes of the crowd G, are laid in as indicated, all the rest of the section of the paper within the frame 9, being left blank.

I now travel the film forward one space, framing the next succeeding unit or view, advance the paper roll 12, a corresponding distance—as many times greater than the travel of the film as the diameter of the enlarged image is greater than that of the film image—and repeat the execution of the color representation with such variations as any change in the objects or their positions may require, guided as before by the projection. This procedure I repeat until the color draft for the red for the entire film has been made.

It will be understood that it is not essential that the connection between the roller 14 and the motion head be maintained, nor that the movements of the roll 12 be made simultaneously with those of the film. It is sufficient that for each advance of the film to the next view the roll 12, be advanced proportionately and its exact position in the frame, if not controlled by such an arrangement of gearing or the like as shown, shall be indicated, (as by marks to register with the frame 9,) in order that it may later be traveled and held, alternately, before the objective with each unit of the color representation successively in its original position relative thereto.

The roll 12, bearing the color representation for the red of the subject, being removed, a fresh roll of art paper is inserted, or roved, as described for the first, the picture film is rewound and framed at the first view and I proceed to make the representation of another of the component colors, say the yellow, in the manner described for the red. This color will, for the view shown in Fig. 2, consist, as indicated in Fig. 4, of patches of various depths or shades, as desired severally for the yellow portions of the autumn wood B, the greens of the brown hill C, a strip of comparatively deep tone for the yellow component of the green stretch of rising ground D, and patches as desired for portions of the crowd G.

Upon the completion of the color representation for the yellow the procedure is repeated for the blue. The representation for this color, as related to the view Fig. 2, is indicated in Fig. 5; for the sky A, a broad wash of deep color growing lighter toward the horizon; a strip of blue for the green of the rising ground D, and patches as desired for the mixed colors of the crowd G.

A film negative is next made of each of these color representations to the scale of the original film and adapted to register therewith throughout. This is best done by employing as a copying camera the device used for making the color representations—Fig. 1. The rolls bearing these representations are each traveled through the frame 9 and halted with each successive unit in its original position while an exposure is made of a corresponding section of a blank photo-sensitive film traveled through the motion head 2, with corresponding halts in the aperture 2ˣ. During this operation light is excluded from the condensing lenses 7, 7, and the section of the color representation roll within the frame 9 is illuminated with actinic light, as by arc lamps, or daylight admitted by removing the hood 11. For this operation the paper rolls having the color representations are of course carried upon suitable rollers as in their first travel through the frame 9, and the negative film is carried on the reels 4 and 5, identically as the original film was carried. When all of the color representations have been photographed the three negative films are developed in the usual way. From each of these negatives I now make a color-printing strip 3ª, illustrated in Fig. 6, by the well known Collotype process.

Wherever in the specification or claims I use the terms printing strip or color printing strip they are to be understood as designating a continuous succession of printing units analogous to color-printing blocks but having a flexible support. This support may be the ordinary celluloid blank of the motion picture film, or it may consist of any suitable, opaque, material, such as thin copper or waterproofed paper. This strip has marginal slots or perforations as shown in Fig. 6, to enable its being run in register with the picture film to be colored. A substratum of the usual kind is employed to insure the adhesion of the gelatinous element of this printing strip to its flexible foundation.

In making these printing strips from the negatives it is desirable, because of the low degree of sensitiveness of the chromatized gelatin film, to print the entire length of film, or a large part thereof, at the same time. To accomplish this I may employ extremely long tables or like flat surfaces, fitted at intervals with pins adapted to fit the slots of the negative and the printing strip blank, and strips of plate glass to insure the contact of the two when the negative film is superposed upon the gelatin blank. In printing long sections of the strip in this way I may use open daylight or arc lights so distributed as to insure an even illumination. Alternatively, I may run the negative film and the gelatin blank together in a motion-head or upon a sprocketed device adapted to insure register and contact, and print a single-view section or longer portions at a time; the procedure being similar to the making of the positive motion picture film from the negative film.

Having made a color printing strip for each of the component colors for the subject to be produced in color, preferably by the process named above, the coloring of the motion picture film is done by printing from these printing strips in succession upon the picture film, employing the suitable colored ink for each and maintaining, throughout, the register or proper relative position of printing strip and film. The operative parts of a device for this printing are diagrammed in Fig. 9. The film, 3 to be colored is carried upon the reel 20. It is threaded by its marginal slots over the sprocket 21, under the pressure roller 22, and onto the barrel 23. As the film is printed with a color it is wound spirally upon the barrel 23, as shown, 23, Fig. 10, which represents a short section of this barrel in side elevation. Care is taken that when the film is threaded onto the sprocketed roll by its blank lead it shall be so positioned that its first unit shall register with the first unit of the color printing strip 3ª which is carried upon the reel 24, is threaded between the upper and lower of the system of blotter rolls 26, between the pressure rolls 26ª and 26ᵇ and their opposing ink rolls, (the upper ones of the system 27,) and in contact with this film 3, upon the sprocketed roller 21, thence to and upon the take-up reel 29.

Upon the reel 24 the printing strip 3ª, is immersed, in the vat 30, in a suitable dampening solution, such as glycerin and water, and in moving forward to the point of contact with the film 3, is first blotted, or cleared of excessive moisture, by the blotter rolls 26, and then inked by contact with the top members of the system of inking rolls 27,—being pressed into firm contact therewith by the rollers 26ª and 26ᵇ,—this system of rolls being supplied by the contact of their lower members with the usual ink feeding devices, and serving to equalize the distribution of the inks and effect the proper laying of same upon the printing strips. The actual printing is done by actuating the sprocketed roller 21, causing it to draw the film 3, and the inked printing strip 3ª, into contact between itself and the pressure roller 22. This movement is maintained until the entire length of film to be colored has been brought into contact with the printing strip—each individual view in register with its proper printing unit—register being maintained by the sprockets upon the roller 21 (operatively) engaging the usual perforations in the margins of the film and like ones in the printing strip. When the entire film has been printed with one of the component colors in this manner—having been wound, as described, upon the barrel 23 to dry—the printing strip having been similarly taken up by the reel 29, both film and strip are removed upon their supports, duplicates of 23 and 29 are substituted, the ink rolls are cleaned or clean ones substituted, the film when dry is threaded into the device as at first, the printing strip for another of the component colors is inserted similarly to the first, the proper exchange of inks is made in the inking device, and the coloring operation is repeated. The printing of the third component color upon the film is accomplished in like manner, the coloring, or printing, operation being identical for all the component colors.

In the diagram of the printing device, Fig. 9, the system of rolls, 27, is shown as consisting of two sets. This enables the use of both a thin and a heavy ink, of the same color, as sometimes employed in ordinary printing from gelatin plates, to render more perfectly the delicate tints and heavy passages. A single set of inking rolls will suffice for many subjects.

For some classes of subjects I may make my printing strips by the half-tone process instead of the Collotype. In this case the strip may be of one homogeneous material, zinc, for instance, and thin enough to have the necessary flexibility. The difficulty which might be anticipated from the screen effect when the coloring of the film is done by printing from a screen-line printing strip is obviated by the relative change of position of the screen on the different individual views. The pattern of the screen in being thus altered in relation to the image is rendered invisible. A different kind of transparent printing inks may be used on these half-tone printing strips than with the hygroscopic strips, and the "taking" of these colored inks by the gelatin surface of the picture film may be improved by moistening it in a manner similar to that provided for the printing strip when the latter is hygroscopic. The "inks" for the half-tone printing strip and the hygroscopic and moistened picture film are preferably of the dye or water color and gum type.

I prefer to make the picture film, when it is to be colored in accordance with my invention, somewhat less dense in the shadows than usual for monochrome films.

When the subject of a film to be colored is such as an opera or play with characters in brightly colored costumes, it is well, in order to produce brilliant, full-color effects, to substitute for costumes with colors of low actinic value light colored fabrics or those which will photograph light. When the film negative is made with this substitution in dress the after-applied colors are not dulled by opaque photographic passages.

When for a number of individual views or successive units in a picture film there is no apparent motion, or when the motion is confined to a limited part of the picture, as, for instance, in the subject shown in Fig. 2, where, for illustration, we will suppose that during the time of the passage of the motor car across the scene all other objects in the picture are without motion, I may make an exception to the practice of making complete color representations for each unit of the film. In a case like this I may hold the roll of art paper to one position, making but one color representation to be utilized for all units in this one position, and prepare a cut-out color representation of the moving object, the various positions of which relative to the scene may be faintly outlined upon the single color representation as the scenes are successively projected thereon and as indicated by the dotted lines in Fig. 2. When the color representation is being photographed for the succession of motionless units the profile cut-out (as of the motor car) is advanced for the particular unit being superposed upon the color representation in progressive positions, as indicated by these dotted lines.

A convenient modification of the device Fig. 1, may be made which enables the maker of the color representations to work outside, or behind, the hood instead of within. To accomplish this the backing board 9ª, is replaced by a plate of glass and the art paper, which in this case should be semi-transparent, is caused to travel outside against the same. The image is visible through the paper, the projection being made in reverse.

Separate sheets of art paper may be used, instead of a continuous roll, for the individual color representations. But in so doing they must be accurately placed, and identically for execution and copying, and of course in the same order.

It is to be understood that wherever I use the term "film" or "picture film" as being employed for guidance in making the color representations, it is designed to cover either a negative or positive film, as either will serve; it being merely a matter of the usual placing on the reels, or a reversal thereof.

I purpose to make the devices herein described the subjects of separate application.

Wherever in the claims the term "color representations" is used it is to be understood as designating the painted, or otherwise prepared, layouts or placements of the masses, of proper actinic values, to be copied for the making of the color printing element and consisting of masses or forms done in pigments or other suitable materials in conformity to the projected images.

I claim:—

1. The method of producing colored motion picture films comprising projecting upon a suitable surface enlarged images of the individual views of a motion picture film, executing upon said surface by the guidance of said images representations of the desired distribution of the component colors for said film, making from said color representations printing strips adapted to register with said film and printing upon said film or its like from said printing strips in colors.

2. The method of producing colored motion picture films comprising making a monochromatic motion picture film, projecting upon a suitable surface enlarged images of the individual views of said film, executing upon said surface by the guidance of said images representations of the desired distribution of the component colors for said film, making from said color representations printing strips adapted to register with said film and printing upon said film from said printing strips in transparent colors.

3. The method of producing colored motion picture films comprising making a monochromatic motion picture film, projecting enlarged images of the views of said film, executing in colors by the guidance of said images representations of the desired coloring for said film, making from said color representations a set of color-selection negatives, making from said negatives color printing strips adapted to register with said film and printing upon said film from said printing strips in transparent colors.

4. The method of producing colored motion picture films comprising making a monochromatic motion picture film, projecting upon a suitable surface enlarged images of the individual views of said film, executing upon said surface by the guidance of said images representations of the desired distribution of the component colors for said film, making from said color representations printing strips adapted to register with said film and printing upon said film or a duplicate thereof in colors.

5. The method of producing colored motion picture films comprising making a monochromatic motion picture film, projecting enlarged images of the views of said film, executing in colors by the guidance of said images representations of the desired coloring for said film, making from said color representations a set of color-selection negatives, making from said negatives color printing strips adapted to register with said film and printing upon said film or a duplicate thereof in colors.

In testimony whereof I have affixed my signature, in presence of two witnesses.

ADDISON T. SAUNDERS.

Witnesses:
DEXTER A. ATKINS,
THOMAS RANNEY.